April 21, 1964     H. H. OLSON     3,129,599
REVERSING COUNTER

Filed June 20, 1960     8 Sheets-Sheet 1

FIG. I.

INVENTOR.
HERBERT H. OLSON
BY *John F. A. Earley, Jr.*
ATTORNEY

INVENTOR.
HERBERT H. OLSON
BY John F. A. Earley, Jr.

ATTORNEY

INVENTOR.
HERBERT H. OLSON

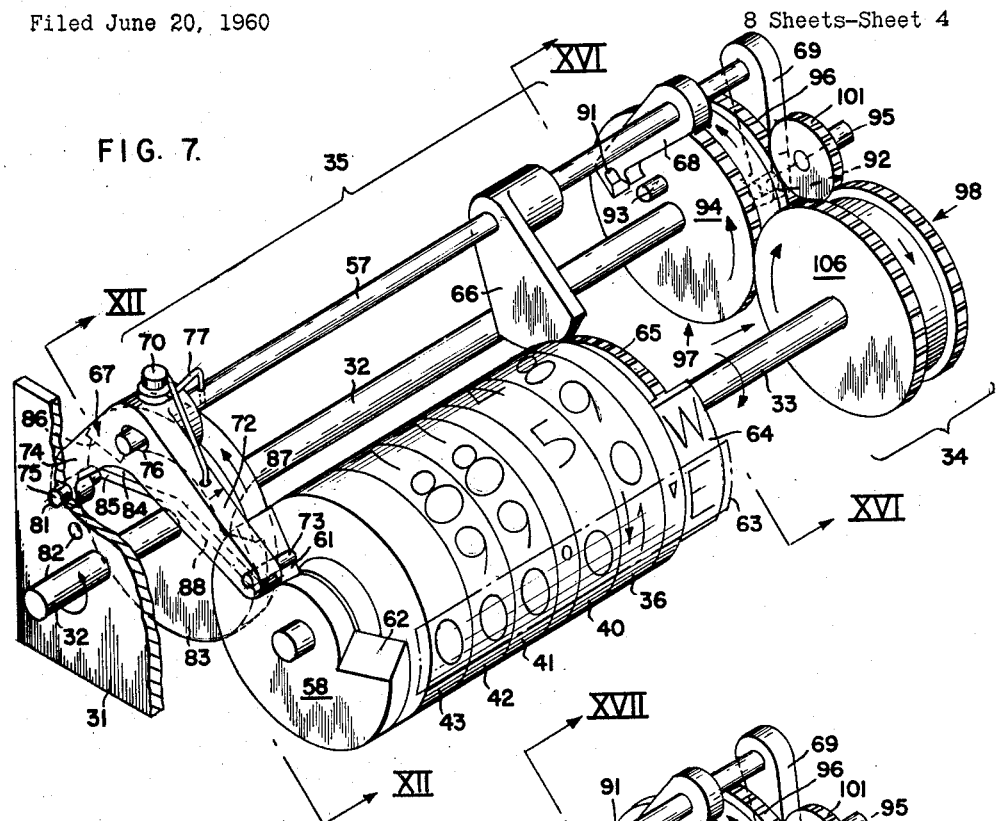
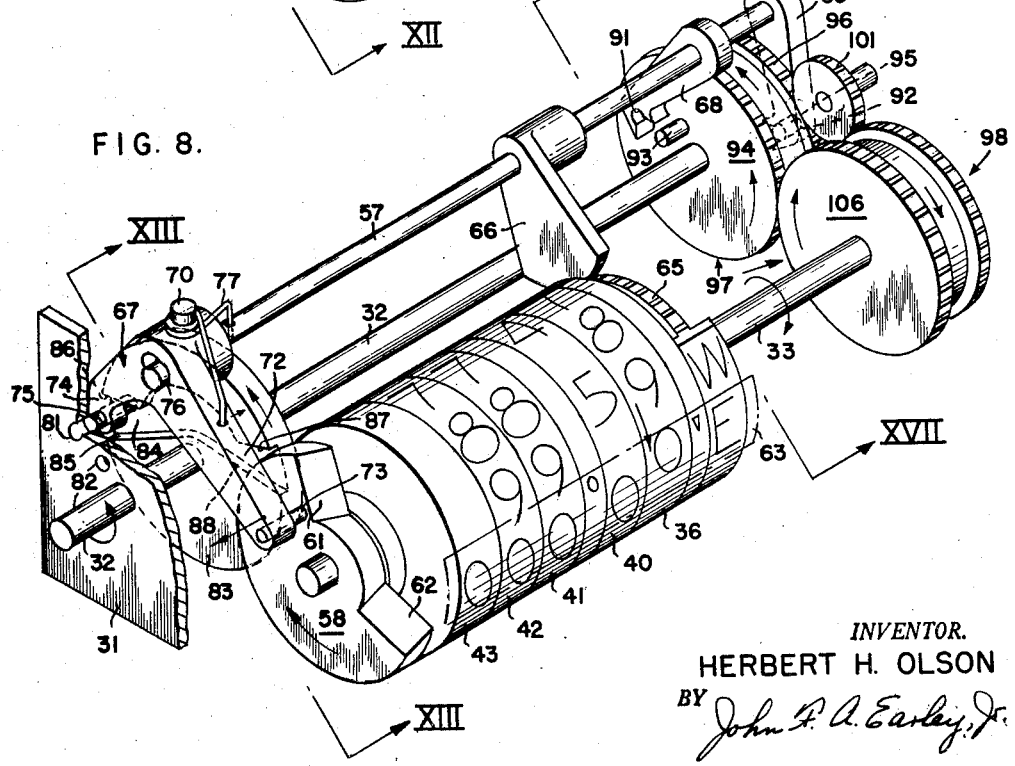

April 21, 1964  H. H. OLSON  3,129,599
REVERSING COUNTER

Filed June 20, 1960  8 Sheets-Sheet 5

*INVENTOR.*
HERBERT H. OLSON
BY *John F. A. Earley, Jr.*
ATTORNEY

April 21, 1964     H. H. OLSON     3,129,599
REVERSING COUNTER

Filed June 20, 1960     8 Sheets-Sheet 6

INVENTOR.
HERBERT H. OLSON
BY *John F. A. Earley, Jr.*
ATTORNEY

INVENTOR.
HERBERT H. OLSON
BY John F. A. Earley, Jr.
ATTORNEY

April 21, 1964   H. H. OLSON   3,129,599
REVERSING COUNTER
Filed June 20, 1960   8 Sheets-Sheet 8

INVENTOR.
HERBERT H. OLSON
BY
John F. A. Earley, Jr.
ATTORNEY

United States Patent Office 3,129,599
Patented Apr. 21, 1964

3,129,599
REVERSING COUNTER
Herbert H. Olson, Glenolden, Pa., assignor, by mesne assignments, to Litton Industries, Inc., Beverly Hills, Calif., a corporation of Delaware
Filed June 20, 1960, Ser. No. 37,477
7 Claims. (Cl. 74—319)

This invention relates to a counter, and more particularly concerns a reversing counter using a differential gear train to change the direction of rotation of the counter wheels.

It is an object of this invention to provide large, easily readable, counter numerals in a minimum space.

It is another object of this invention to provide a counter which utilizes only one set of counter wheels and numbers.

It is another object to provide a counter having counter wheels which reverse their direction of rotation (at a zero marking, for example).

It is another object of this invention to provide a reversing counter wherein after reversal of the direction of rotation of the counter wheels, there is no lagging of read-out as between the counter wheels and the input shaft, since the counter wheels have been brought into synchronism therewith.

It is another object to provide a counter which can reverse the direction of rotation of its counter wheels without changing the direction of rotation of its input shaft.

It is another object to provide a reversing counter which can reverse the direction of rotation of its counter wheels without mechanically disengaging its counter wheel shaft from its input shaft.

Other objects and advantages of this invention, including its simplicity and economy, will further become apparent hereinafter and in the drawings, in which:

FIGS. 7–10 are views in perspective, and partly diagrammatic with some parts, such as the conventional carry-over between drums, being omitted for the sake of clarity, and shows the progression of steps as the counter wheels change their direction of rotation;

Figure 1:
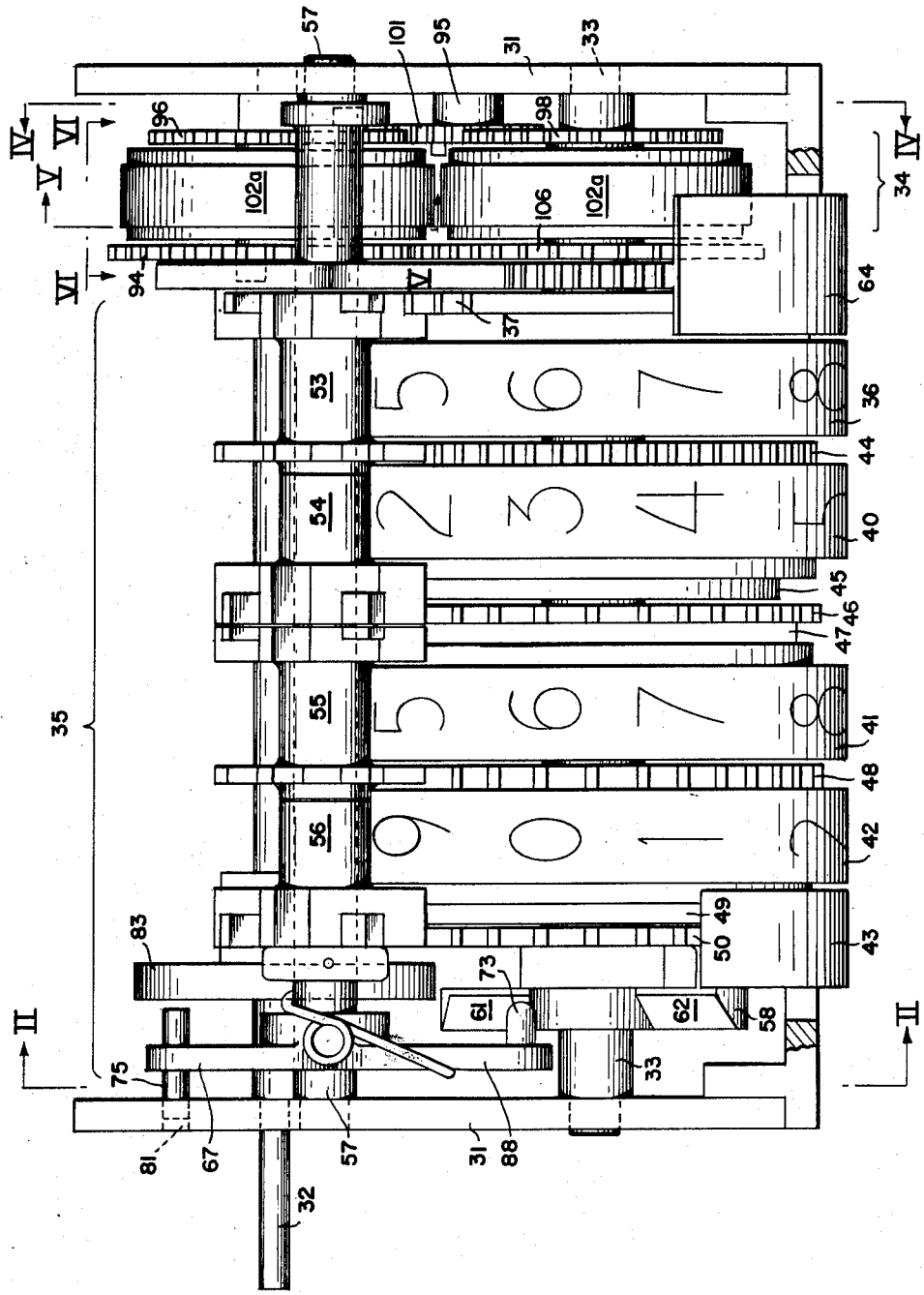
FIG. 1 is a view in top plan of a reversing counter constructed in accordance with this invention.
Figure 2:
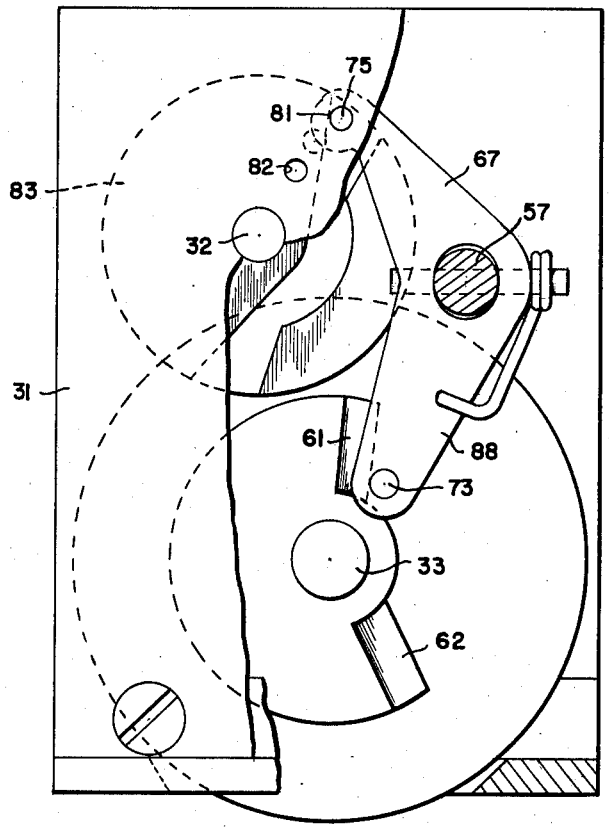
FIG. 2 is an end view of the reversing counter shown in FIG. 1 taken as indicated by the lines and arrows II—II which appear in FIG. 1.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a reversing counter constructed in accordance with this invention including a frame 31 having a rotatable input shaft 32 and a rotatable counter shaft 33 mounted side-by-side therein, transfer mechanism 34 connected between input shaft 32 and counter shaft 33 for transferring the rotation therebetween, and reversing means 35 operatively connected between input shaft 32 and transfer mechanism 34 for reversing the operation of transfer mechanism 34 so as to reverse the direction of rotation of counter shaft 33 relative to input shaft 32 and bring counter shaft 33 into synchronism with input shaft 32 after such reversal.

Counter shaft 33 has fixedly mounted thereon a counter wheel 36 (FIG. 1) having a gear segment 37 that transfers rotation of wheel 36 to adjacent wheel 40 which is freely mounted on shaft 33. Wheel 40 is provided with gear 44, which receives the rotation transferred from gear 37 through transfer pinion 53, and with gear segment 45 that transfers the rotation of wheel 40 to freely mounted counter wheel 41. Counter wheel 41 has a gear 46, which receives the rotation from gear 44 through transfer pinion 54, and a gear segment 47 that transfers rotation of wheel 41 to adjacent counter wheel 42 which is freely mounted on shaft 33. Counter wheel 42 is provided with gear 48, which receives the rotation transferred from wheel 41 through transfer pinion 55, and with gear segment 49 that transfers part of the rotation of wheel 42 to gear 50 of counter wheel 43 through transfer pinion 56.

Counter wheel 43 has an actuating cam 58 having cam surfaces 61, 62 which form part of reversing means 35. Transfer pinions 53—56 are mounted on reversing shaft 57, and transfer rotation from one counter wheel to the next.

Figure 3:
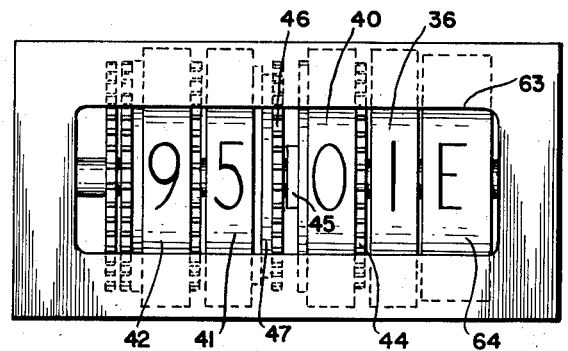
FIG. 3 is a view in front elevation of the reversing counter shown in FIG. 1, but showing different indicator numbers on the counter wheels.

A window 63 (FIG. 3) is provided through which may be seen the counter wheels, and an E-W flag 64 (which is rotatably mounted on counter shaft 33). Flag 64 (FIG. 7) has a gear section 65 which is operated by sector gear 66 mounted on receiving shaft 57 and rotatable therewith.

Reversing means 35 (FIG. 7) includes actuating cam 58 of end counter wheel 43, reversing rocker 67 which is pivotally mounted on reversing shaft 57 by pivot pin 70, reversing shaft 57, and gear locking arms 68, 69 mounted on the far end of reversing shaft 57.

Reversing rocker 67 includes actuating arm 72 having a pin 73 mounted at its end, and locking arm 74 having a pin 75. Reversing rocker 67 is provided with a slot 76 which receives shaft 57 and permits limited rotational movement of rocker 67 about pivot pin 70. Locking spring 77 on rocker 67 urges pin 75 of locking arm 74 towards frame 31 and urges pin 73 of actuating arm 72 towards actuating cam 58.

Frame 31 is provided with holes 81, 82 which are adapted to receive locking pin 75 to hold reversing rocker 67 against rotation. As an example of operation of reversing rocker 67, when the counter reads 000°00′, the continued rotation of input shaft 32 and counter shaft 33 causes counter wheels 36, 40—43 to rotate in unison so that cam surface 61 contacts actuating pin 73 to move actuating arm 72 about pivot pin 70 against the action of locking spring 77. This causes locking arm 74 to rotate about pin 70 in such a manner as to withdraw locking pin 75 from hole 81. Thereupon, locking pin 75 is ready to be moved to hole 82.

Figure 9:
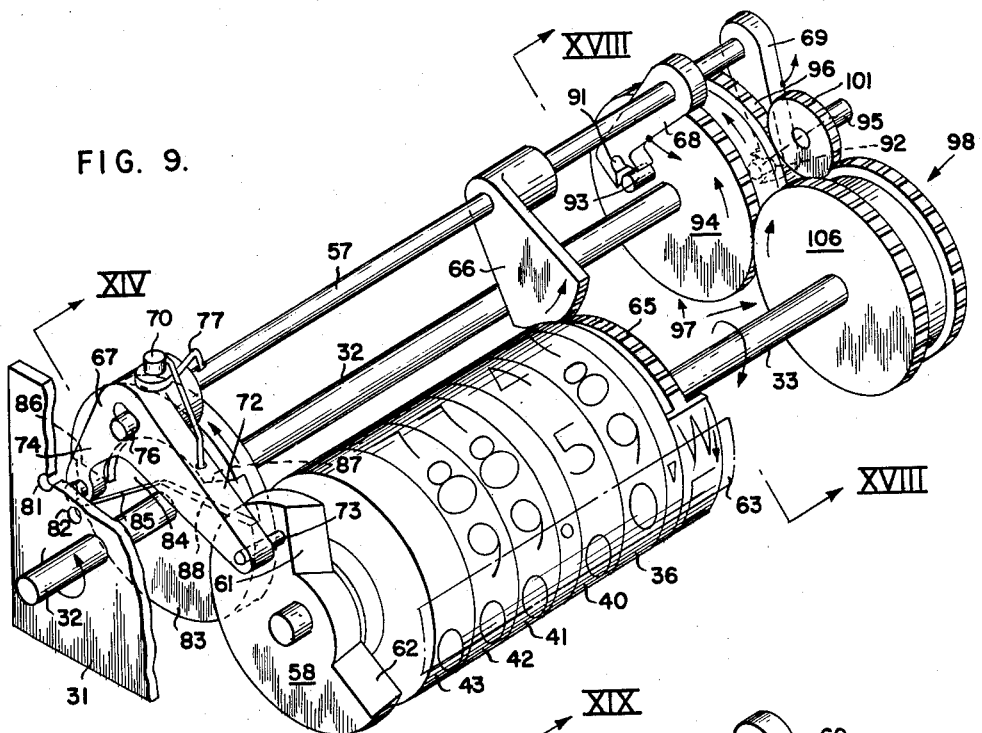
Figure 10:
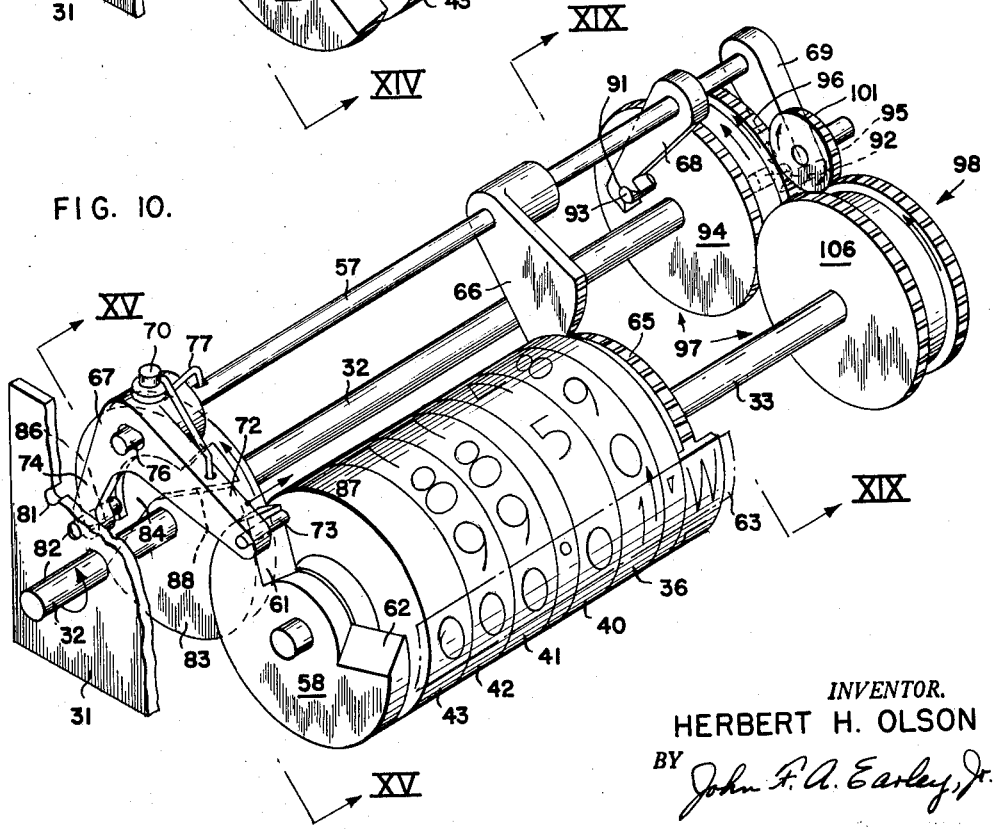
Figure 13:
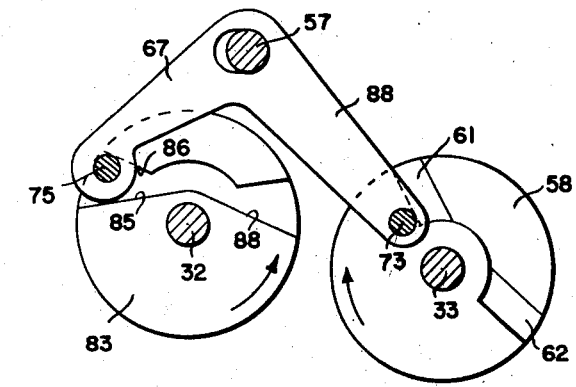
Figure 14:
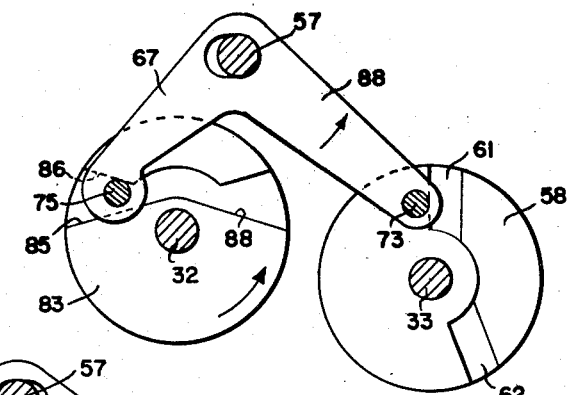
Figure 15:
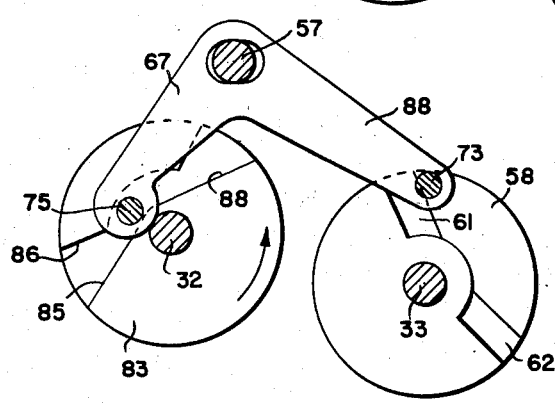

Mounted on input shaft 32 is a pickup cam wheel 83 which rotates with input shaft 32 and is provided with a recess 84 having shoulders 85—88. As is shown by FIGS. 8 and 13, after locking pin 75 has been withdrawn from hole 81, its inner end is contacted by shoulder 86 to move pin 75 toward hole 82. This movement continues (as shown by FIGS. 9 and 14) until locking pin 75 reaches hole 82 (as shown in FIGS. 10 and 15). Actuating cam 58 reverses its direction of rotation, and spring 77 pivots rocker 67 to urge pin 75 into hole 82 (FIG. 10).

Gear locking arm 68 (at the far end of shaft 57) is provided with a locking slot 91, and gear locking arm 69 is provided with locking slot 92. Locking slot 91 is adapted to receive a gear pin 93 (mounted on a gear 94) and thereby lock gear 94 in a stationary position relative to input shaft 32 on which gear 94 is freely mounted.

Similarly, locking slot 92 is adapted to receive a gear pin 95 (mounted on a gear 96) in order to hold gear 96 in a stationary position relative to input shaft 32 on which it is freely mounted.

When locking pin 75 of reversing rocker 67 is in the position of hole 81 (FIG. 8), gear locking arm 69 holds gear 96 stationary while gear 94 is free to rotate. When locking pin 75 is in the position of hole 82 (FIG. 10), gear locking arm 68 holds gear pin 93 to prevent rotation of gear 94, while gear locking arm 69 is withdrawn from engagement with gear pin 95 so that gear 96 is free to rotate.

Figures 11, 12:
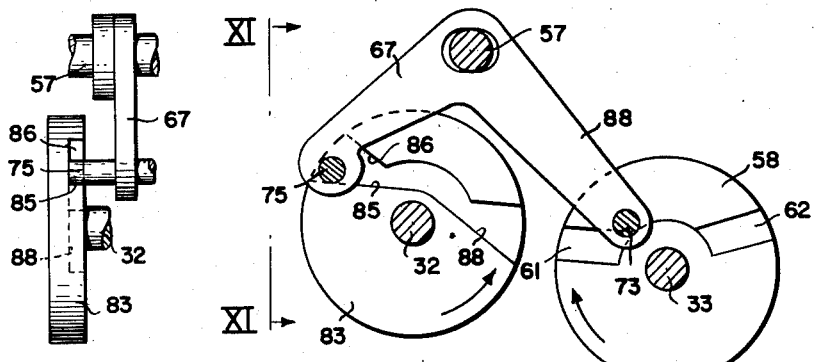
FIGS. 11–15 are diagrammatic views showing the operation of the reversing rocker element of the invention (FIG. 11 being a view in side elevation taken as indicated by the lines and arrows XI—XI which appear in FIG. 12)

FIGS. 11–15 show the operation of the reversing rocker 67 as it is actuated by cam 58 and pickup cam wheel 83 to move locking pin 75 from the position of hole 81 to hole 82. FIG. 12 corresponds to FIG. 7 and is taken as indicated by the lines and arrows XII—XII which appear in FIG. 7. FIG. 13 corresponds to FIG. 8 and is taken as indicated therein by the lines and arrows XIII—XIII. FIG. 14 corresponds to FIG. 9 and is taken as indicated by the lines and arrows XIV—XIV therein. FIG. 15 corresponds to FIG. 10 and is taken as indicated by the lines and arrows XV—XV therein.

Transfer mechanism 34 (FIG. 7) includes differential gear means 97 and 98 and change-of-direction idler gear 101 which is connected therebetween. FIGS. 1 and 4–6 show the structure of transfer mechanism 34, FIGS. 7–10 show diagrammatically how transfer mechanism 34 fits into the overall structure of the reversing counter, FIGS. 16–19 show the operation of gear locking arms 68, 69 as they reverse the rotation of transfer mechanism 34 and bring counter shaft 33 into synchronism with input shaft 32, and FIGS. 20–21 illustrate diagrammatically the structure and operation of transfer mechanism 34.

Referring to FIGS. 1, and 4–6, differential gear means 97 includes a housing 102a mounted on input shaft 32 and rotatable therewith, planet gears 103a and 103b rotatably mounted in housing 102a, planet gears 104a, 104b rotatably mounted in housing 102a, gear 94 which includes gear elements 94a and 94b, and gear 96 which includes gear elements 96a and 96b.

Figure 20:
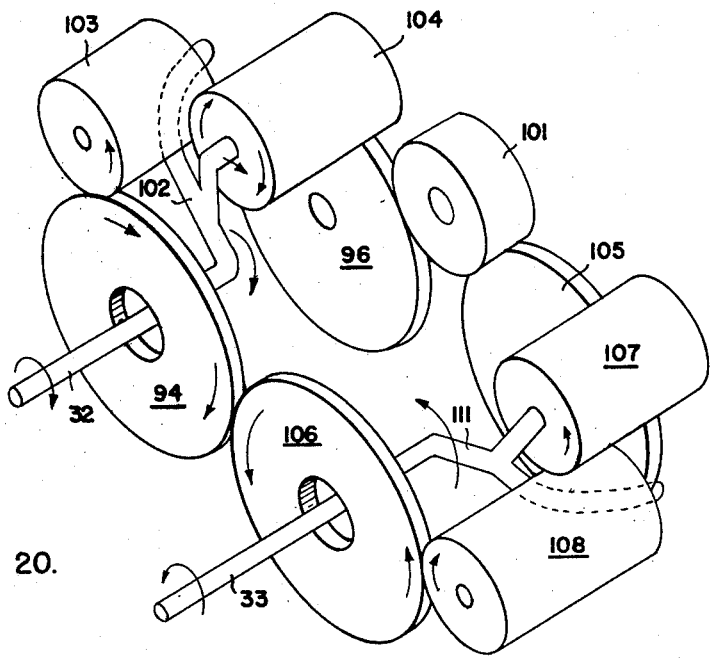
FIG. 20 is a diagrammatic view showing the operation of the differential gear means of the invention with the counter shaft rotating in a direction opposite to the rotation of the input shaft.
Figure 21:
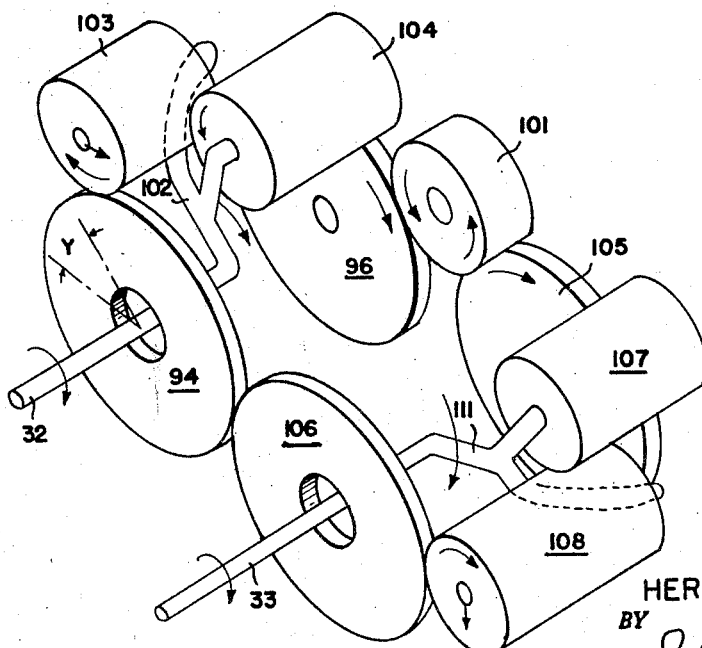
FIG. 21 shows a view similar to FIG. 20 but with the counter shaft rotating in the same direction as the rotation of the input shaft.

In FIGS. 20–21, planet gears 103a, 103b are represented by the single planet gear 103, and planet gears 104a, 104b are represented by the single planet gear 104. Housing 102a is represented diagrammatically in FIGS. 20–21 by the forked arm 102.

Differential gear means 98 is constructed in a similar manner, and is provided (FIGS. 20–21) with gears 105, 106, and planet gears 107, 108 mounted in a housing represented by forked arm 111 which is connected to counter shaft 33.

In the operation of transfer mechanism 34 (FIG. 20), with gear 96 held in locked position by gear locking arm 69, the clockwise rotation of input shaft 32 (which may be driven by a servomotor) is transmitted to counter shaft 33 to cause counter shaft 33 to rotate in a counterclockwise direction in the following manner. The rotation of input shaft 32 causes clockwise rotation of forked arm (housing) 102 which causes planet gear 104 to rotate about its shaft in a clockwise direction and to travel around the perimeter of gear 96. Clockwise rotation of planet gear 104 causes counterclockwise rotation of planet gear 103 which causes clockwise rotation of gear 94. Gear 94 rotates gear 106 in a counterclockwise direction, which rotates planet gear 108 in a clockwise direction. Planet gear 108 rotates planet gear 107 in a counterclockwise direction, and planet gear 107 travels around the perimeter of locked gear 105 to rotate forked arm (housing) 111 in a counterclockwise direction, and so to rotate counter shaft 33 in a counterclockwise direction.

In the operation of transfer mechanism 34 with gear 94 held in locked position by gear locking arm 68 (as is illustrated in FIG. 21), clockwise rotation of input shaft 32 causes the rotation of the gears in the direction shown by the arrows. Input shaft 32 rotates forked arm (housing) 102 which rotates planet gear 103 and causes it to travel around the periphery of locked gear 94. Gear 103 rotates gear 104. Rotation of gear 104 is transferred through gears 96, change-of-direction idler gear 101, gear 105 and gear 107 to planet gear 108 which rotates around the periphery of fixed gear 106 to rotate forked arm (housing) 111 which rotates counter shaft 33 in a clockwise direction.

In passing through zero degrees longitude from east to west (as illustrated in FIGS. 7–10), or in passing through zero degrees longitude from west to east, the direction of rotation of counter shaft 33 must reverse in relation to the direction of rotation of input shaft 32 since the counter numbers descend, pass through zero, and then start ascending. The same problem presents itself when an airplane, for example, flies over 180 degrees longitude, or flies over the equator, the North Pole, or the South Pole; the counter wheel numbers must reverse their direction of rotation while the direction of rotation of input shaft 32 remains the same.

Figure 4:
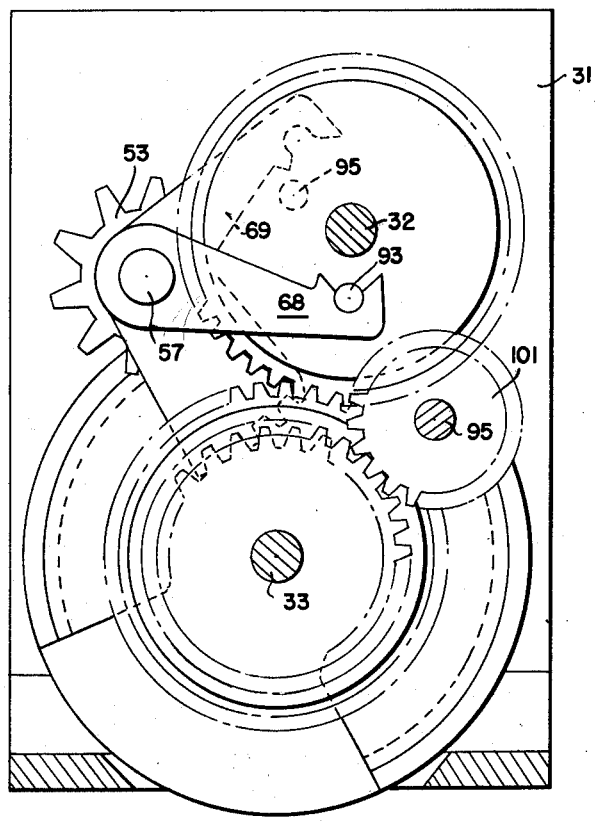
FIG. 4 is an end view taken as indicated by the lines and arrows IV—IV which appear in FIG. 1.
Figure 5:
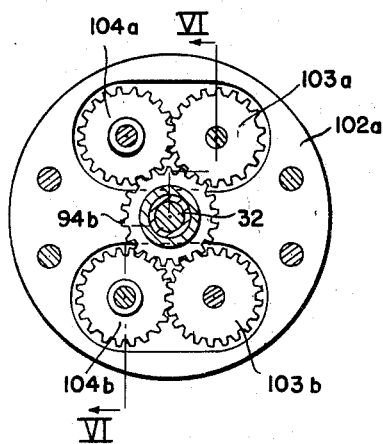
FIG. 5 is a view in section of differential gear means forming an element of this invention, taken as indicated by the lines and arrows V—V which appear in FIGS. 1 and 6.
Figure 6:
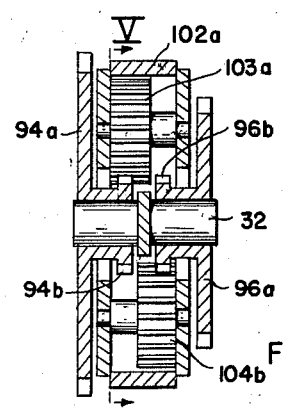
FIG. 6 is a view in section taken as indicated by the lines and arrows VI—VI which appear in FIG. 5.

The operation whereby the rotation of counter shaft 33 is reversed is as follows, referring to FIGS. 7–10, and 12–15, which are somewhat diagrammatic for the sake of clarity (for example, idler gear 101 is shown on top instead of on the side as in FIG. 4).

As the counter approaches 000°00′ from the east, cam surface 61 of actuating cam 58 is brought into contact with actuating pin 73. Counter wheels 36, 40—43 rotate in unison with actuating cam 58 and reversing rocker 67 is cammed outwardly by cam surface 61 about pivot pin 70 to withdraw locking pin 75 from hole 81. Locking pin 75 is moved toward hole 82 by pickup cam 83 to rotate reversing shaft 57.

This rotation of reversing shaft 57 disengages locking slot 92 of gear locking arm 69 from gear pin 95, and brings locking slot 91 of gear locking arm 68 into contact with gear pin 93 of gear 94. It will be noted from the progression of FIGS. 7–10 (and FIGS. 16–19) that gear locking arm 68 engages pin 93 before gear locking arm 69 disengages from pin 95.

Rotation of reversing shaft 57 also causes the rotation of sector gear 66 which flips flag 64 from an indication of east to an indication of west.

As will be understood from an examination of FIGS. 7–10, the reversal of the direction of rotation of transfer mechanism 34 is positively actuated by the counter shaft 33 and counter wheels 36, 40—43. The reversing action takes place after the counter has indicated zero, and occurs during a period of overtravel of the counter shaft 33 in the direction in which it was rotating (FIGS. 8, 9). If this overtravel were not compensated for, the counter indication would lag behind the true indication corresponding to the rotation of input shaft 32. To bring the counter shaft 33 into synchronism with input shaft 32 after such a reversal, has presented a problem of considerable difficulty.

The operation whereby the rotation of counter shaft 33 is brought into synchronism with input shaft 32 after reversal so that read-out on the counter corresponds to the rotation of input shaft 32 will be explained by referring to FIGS. 16–19.

Figure 16:
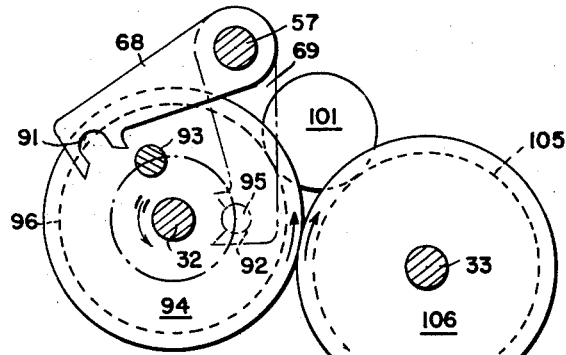
FIGS. 16–19 are diagrammatic views showing the operation of the reversing means element of the invention.

FIG. 16 shows the position of the elements as the counter approaches zero, and corresponds to the position shown in FIG. 7 indicated by the lines and arrows XVI—XVI.

Figure 17:
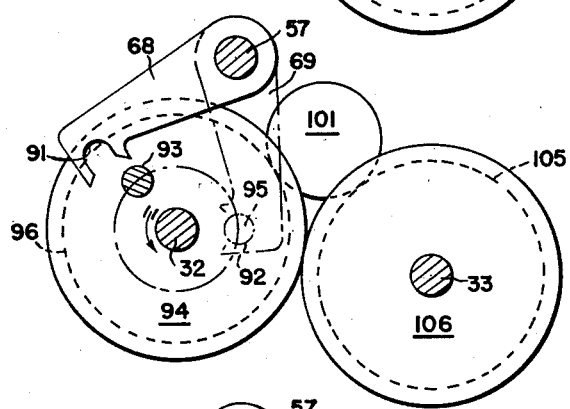

FIG. 17 is similar to FIG. 16 except that the gears 94, 96 have rotated somewhat farther to move the position of gear pin 93 as shown. FIG. 17 corresponds to the zero position of the counter shown in FIG. 8 and is taken as indicated by the lines and arrows XVII—XVII therein.

Figure 18:
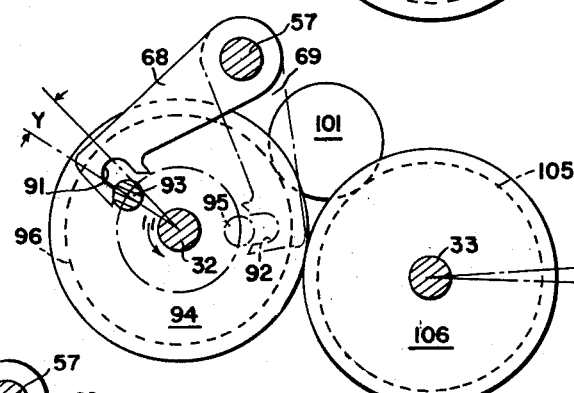
Figure 19:
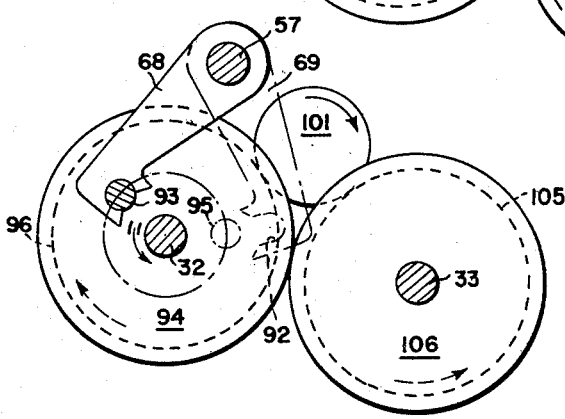

FIG. 18 shows the elements of the mechanism corresponding to the position of the counter as shown in FIG. 9, and is taken as indicated by the lines and arrows XVIII—XVIII which appear therein. An angle Z indicates the amount of overtravel which has taken place during the reversal of rotation. The rotation of pin 93 has been halted by the shoulder of locking slot 91 which has engaged pin 93. The angle Y represents the amount of overtravel of the pin 93 caused by the overtravel Z of shaft 33. As is seen from the drawings, the further rotation of reversible shaft 57 causes locking slot 91 to cam the pin 93 in a direction reverse to that which it had previously been traveling in order to bring pin 93 into the position it would have assumed had there been no overtravel Z. This reversed motion of gear 94, which corresponds to the overtravel Z is transmitted to gear 106. Gear 106 (FIG. 21) transmits it to gear 108, forked arm (housing) 111 and counter shaft 33 to bring the counter shaft into synchronism with input shaft 32.

It is to be noted that the force required to lock and unlock the differential gear means 97, 98 is obtained directly from counter shaft 33. Cam 58 on the last counter wheel 43 actuates reversing rocker 67 to move the other end of rocker arm 67 inwardly against the force of spring 77 to move locking pin 75 from its hole 81. Pin 75 is moved into the path of the rotating pickup cam wheel 83 (fixed to the input shaft 32) which moves pin 75 into the next hole 82. As pin 75 is moved to the next hole 82, it rotates reversing shaft 57 which operates gear locking arms 68, 69.

The lost motion occasioned by the reversal of direction of counter wheel 33 is regained by moving gear 94 backward.

The compensating motion Y (FIG. 18) has been initiated by the camming action of slot 91 of arm 68 against pin 93. Compensating motion Y is transmitted to counter shaft 33 directly between gear 94 (FIG. 20) and gear 106 (with gear 96 locked). If gear 94 is locked, the compensating motion travels by way of gears 103, 104, 96, 101, 105, 107, and 108.

This transfer of the compensating motion Y can also be thought of as a combination of motions, part of the motion going directly from gear 94 to gear 106, and part of it going through gears 103, 104, 96, 101, 105, 107, and 108.

The counter constructed in accordance with this invention occupies a very small frontal space compared to the relatively large size of the numbers which are large enough to be easily read. By having such a small frontal counter area, it is possible to put many more counters in a given face area of a computer.

It is to be understood that the form of the invention herewith shown and described is to be taken as a preferred embodiment. Various changes may be made in the shape, size and arrangement of parts. For example, equivalent elements may be substituted for those illustrated and described, parts may be reversed, and certain features of the invention may be utilized independently of the use of other features, all without departing from the spirit or scope of the invention as defined in the subjoined claims.

The claimed invention:

1. A reversing counter comprising a frame, a rotatable input shaft mounted in the frame, a rotatable counter shaft also mounted in the frame, transfer means connected between the input and counter shafts for transferring the rotation of the input shaft to the counter shaft, reversing means operatively connected to said transfer means and actuated by said counter shaft for changing the operation of the transfer means to reverse the rotation of the counter shaft relative to said input shaft, and means actuated by said reversing means for bringing said counter shaft into synchronism with said input shaft to compensate for any lack of synchronism occurring during such reversal.

2. The reversing counter defined in claim 1, wherein is also provided a direction flag freely mounted on said counter shaft and actuated by said reversing means.

3. A reversing counter comprising a frame, a rotatable input shaft mounted in the frame, a rotatable counter shaft mounted in the frame, a differential gear mechanism having two sun gears operatively connected to said input shaft, a differential gear mechanism operatively connected to said counter shaft and having two sun gears operatively connected to said counter shaft, one of said counter shaft sun gears being in mesh with one of said input shaft sun gears to form a meshed set of sun gears, an idler gear in mesh with the other of said input shaft sun gears and the other of said output shaft sun gears to form an idler gear connected set of sun gears, gear locking-arm means operatively connectable to said sun gears for holding one set of sun gears stationary while the other set is free to rotate, reversing means operatively connected to said locking-arm means for changing its operation to hold the other set of sun gears stationary and to release the stationary set for rotation, and thereby reverse the direction of rotation of said counter shaft, and synchronizing means operatively connected to said counter shaft and actuated by said reversing means for bringing said counter shaft into synchronism with said input shaft to compensate for any lack of synchronism occurring during such reversal.

4. The reversing counter defined in claim 3, wherein said synchronizing means includes a pin mounted on each of said input shaft sun gears, and camming means mounted on said locking-arm means for contacting one of said pins and moving it backwardly to compensate for the overtravel it sustains in reversing the direction of rotation of said counter shaft.

5. A reversing counter comprising a frame, a rotatable input shaft mounted in the frame, a rotatable counter shaft also mounted in the frame, transfer means connected between the input and counter shafts for transferring the rotation of the input shaft to the counter shaft, a reversing shaft, a reversing rocker mounted on the reversing shaft and having an actuating arm with a pin and a locking arm with a pin, a spring connected to said rocker holding said locking-arm pin in place in a hole in said frame, an actuating cam mounted on said counter shaft for moving said actuating-arm pin against the force of said spring and withdrawing said locking-arm pin from said hole, a pickup cam wheel mounted on said input shaft for moving said locking-arm pin to another hole in said frame and for rotating said reversing shaft, and connecting means between said reversing shaft and said transfer means for changing the operation of the transfer means to reverse the direction of rotation of said counter shaft.

6. The reversing counter defined in claim 5, wherein said transfer means includes a differential gear mechanism mounted on said input shaft and having two sun gears, and said connecting means includes a pair of gear locking arms mounted on said reversing shaft with one gear locking arm engaging one of said sun gears to hold it stationary while the other is disengaged from said other sun gear to permit it to rotate, and the rotation of the reversing shaft engages said disengaged gear locking arm and disengages said engaged gear locking arm to reverse the direction of rotation of said counter shaft.

7. A reversing counter comprising a frame, a rotatable input shaft, a rotatable counter shaft, and a reversing shaft mounted in the frame, a differential gear mechanism operatively connected to said input shaft and having two sun gears, a differential gear mechanism mounted on said counter shaft and having two sun gears operatively connected respectively to said input shaft sun gears, an idler gear in mesh with one set of said operatively connected sun gears, a reversing rocker mounted on the reversing shaft and having an actuating arm with a pin and a locking arm with a pin, a spring connected to said rocker to hold said locking-arm pin in place in a hole in said frame, an actuating cam mounted on said counter shaft for moving said actuating-arm pin against the force of said spring and thereby withdrawing said locking-arm pin from said hole, a pair of gear locking arms mounted on said reversing shaft with one of said gear locking arms holding one of said input shaft sun gears stationary, a pickup cam wheel mounted on said input shaft for moving said locking-arm pin to another hole in same frame, and for rotating said reversing shaft to bring the other gear locking arm in contact with the other input shaft sun gear to hold it stationary and to disengage said first gear locking arm to free said first input shaft sun gear for rotation, thereby reversing the direction of rotation of said counter shaft, a pin mounted on each of said input shaft sun gears, and camming means mounted on said locking arms for contacting one of said pins and moving it backwardly to compensate for the overtravel it sustains in reversing the direction of rotation of said counter shaft.

References Cited in the file of this patent
UNITED STATES PATENTS

| | | |
|---|---|---|
| 780,733 | Smith | Jan. 24, 1905 |
| 944,978 | Temple | Dec. 28, 1909 |
| 1,002,450 | Readwin | Sept. 5, 1911 |
| 2,829,532 | Togstad | Apr. 8, 1958 |
| 2,874,584 | Ahlport | Feb. 24, 1959 |
| 3,022,946 | Glass et al. | Feb. 27, 1962 |